Patented May 20, 1947

2,420,735

UNITED STATES PATENT OFFICE 2,420,735

TREATMENT OF PROTEIN WITH ACIDS AND PRODUCT RESULTING THEREFROM

John Robert Coffman, St. Paul, Minn., and Harry F. Lewis, Appleton, Wis., assignors, by mesne assignments, to General Mills, Inc., a corporation of Delaware No Drawing. Application August 23, 1945, Serial No. 612,307

10 Claims. (Cl. 260—112)

The present invention relates to modified proteins and to a process of effecting such modification and more particularly to the modification of proteins for use in plastics having low water absorption properties.

The present application is a continuation in part of our co-pending application, Serial No. 448,292, filed June 24, 1942.

Numerous attempts have been made to modify proteins to make them satisfactory for use as plastics, in view of the low cost of such proteins and in view of their ready availability. In general, most of these protein plastics have proved unsuccessful commercially except in very limited circumstances. They absorb excessive quantities of water and as a result lose their shape. In some instances this excessive absorption of water also results in such a loss of strength that the products disintegrate very readily. These disadvantages are emphasized in certain uses of plastics such, for example, as machine parts in which close tolerances are required. The protein plastics of the prior art lose their shape to such an extent when they absorb water that they are entirely unsuitable for such uses.

It has now been discovered that proteins may be treated according to the present invention to produce a product of materially reduced water absorption. In general, the water absorption of protein after treatment according to the present invention is approximately half of what it was prior to treatment.

It is, therefore, the principal object of the present invention to provide a modified protein having low water absorption properties. It is a further object of the present invention to provide a method of producing such modified protein.

These and other objects of the invention will be apparent from the following description thereof with particular reference to specific examples which are given for the purpose of illustration and which are not to be construed as limiting the invention.

The invention is applicable to proteins in general, such as casein, soybean protein, zein, wheat gluten, and the like, whether isolated from materials with which they naturally occur or in admixture with other materials. For purposes of the present invention the treatment will be described with particular reference to wheat gluten, it being understood that similar treatment is applicable to other proteins.

The invention involves the treatment of proteins with relatively concentrated solutions of highly ionized mineral acids such as hydrochloric acid and sulfuric acid, in combination with nitrous acid. This treatment which is referred to herein as nitrous acid treatment, completely hydrolyzes all ammonium salt groups and all primary amide groups, and at the same time converts primary amine groups to hydroxyl groups.

Analytical data seem to point to the fact that this treatment affects the protein chemically in the manner described above. Thus, the base binding capacity of the treated protein is materially higher than that of the untreated protein, indicating hydrolysis of ammonium and primary amide groups to carboxyl groups. Formol titration of the nitrous acid treated proteins shows a decrease in primary amine groups indicating the conversion of primary amine groups to hydroxyl groups. The conversion of primary amine groups to hydroxyl groups and the conversion of primary amide groups to carboxyl groups is further indicated by the evolution of large quantities of nitrogen, which is characteristic of these reactions.

The treatments herein described appear to be effected without any appreciable hydrolysis of the peptide bonds. Formol titration, which measures primary amine groups, when applied to the starting material and to the material treated with mineral acid in the absence of nitrous acid shows no change in the content of the primary amine groups. Since hydrolysis of peptide bonds would result in an increase in primary amine groups it was concluded that no hydrolysis of peptide bonds had occurred. Since nitrous acid results in a destruction of primary amine groups it is apparent that formal titration of the nitrous acid treated gluten would not be significant as a measure of the peptide bond hydrolysis. However, the conditions affecting hydrolysis were substantially the same in the nitrous acid treatment as they were in the mineral acid treatment without nitrous acid and accordingly it was concluded that no hydrolysis resulted from the nitrous acid treatment.

The nitrous acid treatment involves treatment of the protein with a mixture of nitrous acid and a highly ionized mineral acid such as hydrochloric or sulfuric in which the hydrogen ion concentration is not appreciably lower in concentration than 1N. The treating acid is preferably obtained by suspending the protein in an acqueous solution of a soluble nitrite such as sodium nitrite and then making the suspension acid with, for example, hydrochloric acid in sufficient quantity and of sufficiently high concentration that the hydrogen ion concentration in the mixture will not be appreciably lower than 1N. The suspension of protein in acid is preferably allowed to stand at room temperature for an extended period of time, as for example, 20 hours. Thereafter, the material is heated to an elevated temperature preferably within the range of 50–80° C., for example 75° C. and the insoluble material separated from the acid. This treatment at an elevated temperature is for the purpose of completing the reaction and should be of short duration, for example, 5–15 minutes. This insoluble material is granular, and can be readily washed to remove acid and other impurities. Part of the protein becomes soluble in the acid and can be separated therefrom by adjusting the pH to a suitable higher value. The separated proteins can be suitably processed for removal of adherent acid and other impurities to yield the desired products.

*Example 1.—HONO gluten*

500 grams of fat-free gluten were suspended in three liters of an aqueous solution containing 104 grams of sodium nitrite and the suspension was stirred for three hours at room temperature. To this suspension there were added in a dropwise manner 273 cc. of 12N HCl over a period of 1.5 hours. The acidified solution was allowed to stand over night, heated to 75° C. and filtered. It was washed by three one-liter portions of water. The gluten was subjected to a second washing with two more liters of water and filtered. The washed gluten was stirred with two liters of water, the suspension adjusted to a pH of 3.0, and filtered. The gluten was dehydrated with two liters of acetone and dried at 50° C. The dried material when suspended in water gave slight chloride ion tests. It was therefore rewashed with water until the washings were free of chloride ion. The dried product weighed 315 grams. This recovery amounts to 66.4% of the original weight of the gluten. The base binding capacity of the original gluten was 31 while that of the nitrous acid gluten was 111. These and other base binding capacities are expressed as equivalents$\times 10^{-5}$ per gram. An additional quantity of nitrous acid gluten may be recovered from the acid filtrate and the various wash waters by pH adjustment, for example to pH values of 2.0, 3.5, 4.0, and 5.5. This material requires more extensive washing for removal of water solubles, but the final product appears to differ principally from the acid insoluble material in its base binding capacity, which was found to be 166.

*Example 2.—HONO-casein, zein, and soya protein products*

250 grams of each of the proteins casein, zein, and soya protein were suspended in 1.5 liters of 0.5N sodium nitrite solution and stirred for three hours at room temperature. To this suspension there was then added, in a dropwise manner, 136 cc. of 12N hydrochloric acid while the protein suspension was well stirred. The resulting mixture was allowed to stand eighteen hours at room temperature. It was then heated to 75° C., filtered, and washed well with water until the washings gave only a slightly positive test for chloride ions. The product was drained well and dried at 70° C. for twenty hours. In the case of casein and soybean protein, the manipulation was simple throughout and the product appeared mealy in all stages of the procedure. The zein tended to form a cake, floating on the surface. However, agitation served to break up the cake into granular particles. Following the reaction the cake which was produced was placed in a Waring Blendor and disintegrated in water so that the resulting material was like fine sand.

| Product | BBC$\times 10^{-5}$ Equivalent per Gram | 24-Hour Water Absorption, Per Cent |
|---|---|---|
| Gluten | 31 | 40 |
| HONO Gluten | 111 | 21 |
| Casein | 83 | 42 |
| HONO Casein | 147 | 25 |
| Soy Protein | 94 | 42 |
| HONO Soy Protein | 137 | 22 |
| Zein | 0 | 13 |
| HONO Zein | 80 | 5 |

As was pointed out above, concentrations of acid appreciably less than 1N do not appear to effect the desired results to any substantial extent. The N acid should be used in excess, usually not less than about 2 parts by weight of N acid to 1 part by weight of protein. Any larger ratio of acid to protein may be employed. Similarly, more concentrated acid may be employed, but in general concentrations materially in excess of about 3N should be avoided as they tend to solubilize the protein. The temperature of reaction is preferably maintained low for a large part of the time and is elevated only near the end of the reaction. The time period may be shortened somewhat by conducting the reaction at temperatures above room temperature. Temperatures in excess of 40° C. should, however, be avoided during the major portion of the reaction in view of the undesirable effect of the acid on the protein when subjected to such temperatures for any extended period of time and in view of the undesirable effect of the elevated temperature on the nitrous acid itself.

It will be apparent from the above examples that the product herein described results in a decided improvement in the characteristics of the protein, thus making the material more useful in instances where water absorption is an important factor. It will also be apparent that the invention is not limited to the specific examples given above and that various modifications may be made without departing from the spirit of the invention as defined in the appended claims.

We claim as our invention:

1. Process for the modification of protein to reduce its water absorptive properties which comprises treating said protein with a treating agent comprising a mixture of nitrous acid and a highly ionized strong mineral acid selected from the group consisting of hydrochloric acid and sulfuric acid, the hydrogen ion concentration of the treating agent being not substantially less than 1N, for an extended period to convert ammonium groups and primary amide groups to carboxyl groups, and to convert primary amine groups to hydroxyl groups without extensive hydrolysis of the peptide bonds.

2. Process for the modification of wheat gluten to reduce its water absorptive properties which comprises treating said wheat gluten with a treating agent comprising a mixture of nitrous acid and a highly ionized strong mineral acid selected from the group consisting of hydrochloric acid and sulfuric acid, the hydrogen ion concentration of the treating agent being not substantially less than 1N, for an extended period to convert ammonium groups and primary amide groups to carboxyl groups, and to convert primary amine groups to hydroxyl groups without extensive hydrolysis of the peptide bonds.

3. Process for the modification of zein to reduce its water absorptive properties which comprises treating said zein with a treating agent comprising a mixture of nitrous acid and a highly ionized strong mineral acid selected from the group consisting of hydrochloric acid and sulfuric acid, the hydrogen ion concentration of the treating agent being not substantially less than 1N, for an extended period to convert ammonium groups and primary amide groups to carboxyl groups, and to convert primary amine groups to hydroxyl groups without extensive hydrolysis of the peptide bonds.

4. Process for the modification of soy protein to reduce its water absorptive properties which comprises treating said soy protein with a treating agent comprising a mixture of nitrous acid and a highly ionized strong mineral acid selected from the group consisting of hydrochloric acid and sulfuric acid, the hydrogen ion concentration of the treating agent being not substantially less than 1N, for an extended period to convert ammonium groups and primary amide groups to carboxyl groups, and to convert primary amine groups to hydroxyl groups without extensive hydrolysis of the peptide bonds.

5. Process for the modification of protein to reduce its water absorptive properties which comprises treating said protein with a treating agent comprising a mixture of hydrochloric acid and nitrous acid, the hydrogen ion concentration of the treating agent being not substantially less than 1N, for an extended period to convert ammonium groups and primary amide groups to carboxyl groups, and to convert primary amine groups to hydroxyl groups without extensive hydrolysis of the peptide bonds.

6. Process for the modification of protein to reduce its water absorptive properties which comprises treating said protein with a treating agent comprising a mixture of hydrochloric and nitrous acids, the hydrogen ion concentration of the treating agent being not substantially less than 1N for an extended period of time at a temperature not substantially in excess of 40° C. and then raising the temperature of the reaction mixture to the approximate range of 50–80° C. for a short period of time, whereby ammonium groups and primary amide groups are converted to carboxyl groups and primary amine groups are converted to hydroxyl groups without substantial hydrolysis of the peptide bonds.

7. A modified protein characterized by reduced water absorption, said protein having a major proportion of its peptide bonds intact and having its primary amine groups converted to hydroxyl groups and having its ammonium groups and primary amide groups converted to carboxyl groups.

8. A modified wheat gluten characterized by reduced water absorption, said wheat gluten having a major proportion of its peptide bonds intact and having its primary amine groups converted to hydroxyl groups, and having its ammonium groups and primary amide groups converted to carboxyl groups.

9. A modified zein characterized by reduced water absorption, said zein having a major proportion of its peptide bonds intact and having its primary amine groups converted to hydroxyl groups, and having its ammonium groups and primary amide groups converted to carboxyl groups.

10. A modified soy protein characterized by reduced water absorption, said soy protein having a major proportion of its peptide bonds intact and having its primary amine groups converted to hydroxyl groups, and having its ammonium groups and primary amide groups converted to carboxyl groups.

JOHN ROBERT COFFMAN.
HARRY F. LEWIS.

REFERENCES CITED

The following references are of record in the file of this patent:

UNITED STATES PATENTS

| Number | Name | Date |
|---|---|---|
| 2,158,117 | Grettie | May 16, 1939 |
| 2,169,955 | Koch | Aug. 15, 1939 |